United States Patent [19]
Kita et al.

[11] Patent Number: 5,352,547
[45] Date of Patent: Oct. 4, 1994

[54] ORGANIC ELECTROLYTIC SOLUTION AND ORGANIC ELECTROLYTIC SOLUTION CELL

[75] Inventors: Fusaji Kita; Kouji Murakami; Akira Kawakami, all of Osaka; Takaaki Sonoda; Hiroshi Kobayashi, both of Fukuoka, all of Japan

[73] Assignee: Hitachi Maxell, Ltd., Osaka, Japan

[21] Appl. No.: 111,435

[22] Filed: Aug. 25, 1993

[30] Foreign Application Priority Data

Aug. 27, 1992 [JP] Japan ................................. 4-254172
Sep. 17, 1992 [JP] Japan ................................. 4-275494
Sep. 17, 1992 [JP] Japan ................................. 4-275495

[51] Int. Cl.$^5$ ............................................. H01M 6/16
[52] U.S. Cl. .................................. 429/194; 429/198; 429/199
[58] Field of Search .................. 429/194, 196–199, 429/218, 245

[56] References Cited

U.S. PATENT DOCUMENTS

| | | | |
|---|---|---|---|
| 4,654,280 | 3/1987 | Bailey | 429/198 X |
| 4,880,714 | 11/1989 | Bowden | 429/197 |
| 4,888,255 | 12/1989 | Yoshimitsu et al. | 429/196 X |
| 4,894,302 | 1/1990 | Hoffman et al. | |
| 5,021,308 | 6/1991 | Armand et al. | |
| 5,162,177 | 5/1992 | Armand et al. | |
| 5,260,145 | 11/1993 | Armand et al. | |
| 5,272,022 | 12/1993 | Takami et al. | 429/197 |

FOREIGN PATENT DOCUMENTS

| | | |
|---|---|---|
| 0364995A2 | 4/1990 | European Pat. Off. |
| 0486704A1 | 5/1992 | European Pat. Off. |
| 2015499A | 9/1979 | United Kingdom |
| WO88/03331 | 5/1988 | World Int. Prop. O. |
| WO92/02966 | 2/1992 | World Int. Prop. O. |

OTHER PUBLICATIONS

Patent Abstracts of Japan, vol. 15, No. 187, May 1991 (JP-1-3049157).
Patent Abstracts of Japan, vol. 17, No. 375, Jul. 1993, (JP-A-5062690).
Patent Abstracts of Japan, vol. 15, No. 175, May 1991 (JP-A-3040372).

*Primary Examiner*—Anthony Skapars
*Attorney, Agent, or Firm*—Birch, Stewart, Kolasch & Birch

[57] ABSTRACT

An organic electrolytic solution containing an organic solvent, and a metal salt having at least one electron attractive group and an anion which contains at least one element selected from the elements of the IIIb to VIb group of the Periodic Table and a charge-center atom of which is bonded to the electron attractive group by an intermediate backbone, in which a maximum distance between the center of the charge-center atom and the center of other atom in the anion is at least 4 Å, and a cell comprising this organic electrolytic solution, both having improved shelf stability.

10 Claims, 1 Drawing Sheet

5,352,547

ORGANIC ELECTROLYTIC SOLUTION AND ORGANIC ELECTROLYTIC SOLUTION CELL

BACKGROUND OF THE INVENTION

1. Field of the Invention

The present invention relates to an organic electrolytic solution and an organic electrolytic solution cell.

2. Description of the Related Art

Organic electrolytic solution cells, a typical example of which is a manganese dioxide-lithium cell, are increasingly used, since they generate a voltage of 3 V or higher and have a high energy density.

$LiClO_4$ is generally use as an electrolyte to be contained in a electrolytic solution used in such organic electrolytic solution cell. Recently, in view of safety of the cells, it is undesirable to use dangerous materials such a $LiClO_4$ in the cells.

Apart from $LiClO_4$, boron lithium salts such as $LiBF_4$ or $LiB(C_6H_5)_4$ are used as the lithium salt electrolytes.

However, when such boron lithium salt is used as the electrolyte, the electrolytic solution tends to be discolored or polymerizes some kinds of media of the electrolytic solution during storage. When such electrolytic solution is used in the cell, a shelf stability of the cell is shortened.

SUMMARY OF THE INVENTION

One object of the present invention is to provide an organic electrolytic solution which is not discolored or a medium of which is not polymerized.

Another object of the present invention is to provide an organic electrolytic solution cell which has a long shelf stability.

According to a first aspect of the present invention, there is provided an organic electrolytic solution comprising an organic solvent, and a metal salt comprising at least one electron attractive group and an anion which comprises at least one element selected from the elements of the IIIb to VIb group of the Periodic Table and a charge-center atom of which is bonded to said electron attractive group by an intermediate backbone, wherein a maximum distance between the center of said charge-center atom and the center of other atom in said anion is at least 4 Å.

According to a second aspect of the present invention, there is provided an organic electrolytic solution cell comprising a positive electrode, a negative electrode and the organic electrolytic solution of the present invention.

DETAILED DESCRIPTION OF THE INVENTION

Figure 1:
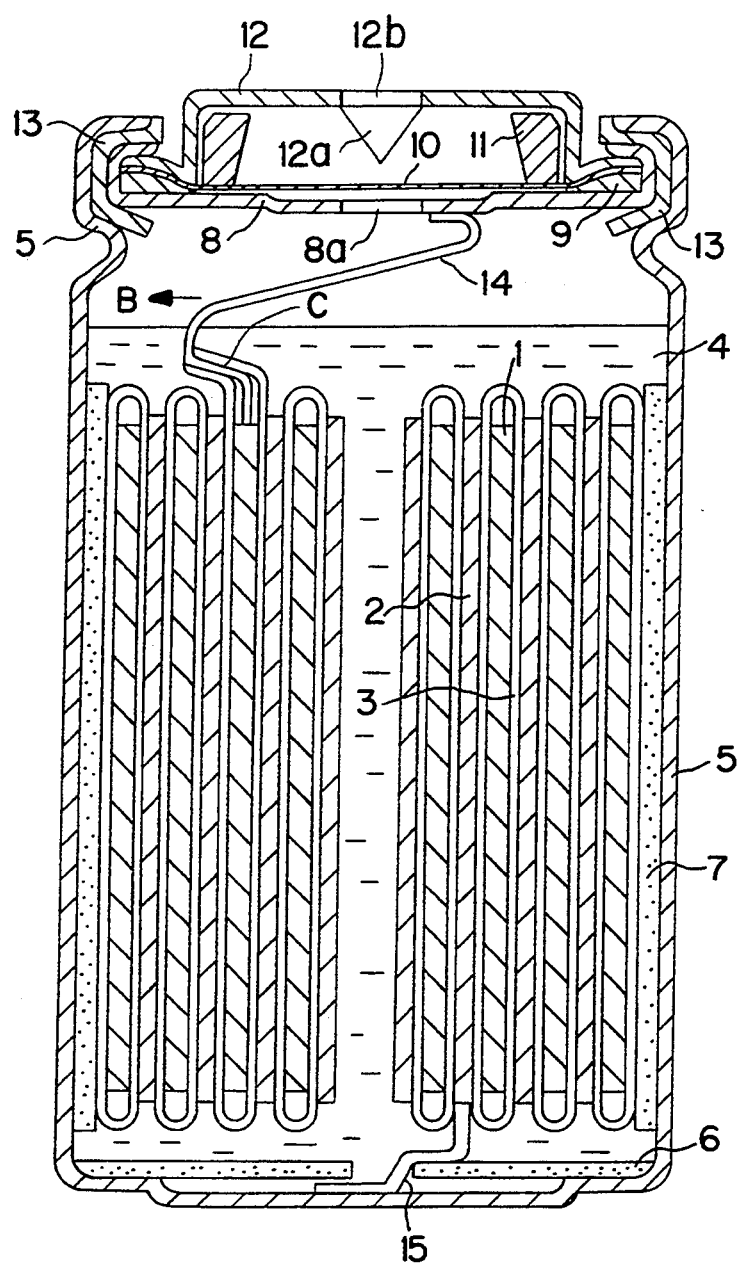
FIG. 1 is a cross sectional view of an organic electrolytic solution cell.

One of the characteristics of the present invention is that the anion of the metal salt which is used as the electrolyte in the electrolytic solution has a steric hindrance barrier structure.

Herein, the steric hindrance barrier structure is used to mean a structure in which it is difficult for a cation to approach the charge-center atom of the anion. In particular, the maximum distance between the center of the charge-center atom and a center of other atom in the anion is at least 4 Å, preferably at least 5 Å, more preferably at least 6 Å.

The organic anion should have at least one electron attractive group. The number of electron attractive groups is preferably at least 4, more preferably at least 5, most preferably at least 6, in view of the shelf stability.

Examples of the electron attractive group are halogen atoms, a —COO— group, a —CN group, and the like. The halogen atom decreases the Coulomb's force between the anion center and the cation center and then increases the distance between the ions.

In a preferred embodiment, the metal salt contains a haloalkyl group. Among the halogen atoms, a fluorine atom is most preferred. The haloalkyl group can stabilize the metal salt because of its electron attractive property, and improve the shelf stability of the electrolytic solution. Preferably, the number of haloalkyl groups is at least 4, more preferably at least 5 for the improvement of shelf stability, and most preferably at least 6.

Examples of the atom which forms the anion center are those of the IIIb to VIb groups of the Periodic Table, such as an oxygen atom (O), a nitrogen atom (N), a carbon atom (C), a boron atom (B), an aluminum atom (Al), and the like. Among them, the atoms of IIIb to IVb groups of the Periodic Table to which at least 3 substituents can be bonded are preferred. In particular, the atom of the IIIb group such as the boron atom is preferred, since four bonds are provided when it forms the anion center, and the substituents provide the steric hindrance around the anion center. Among the IIIb group atoms, the boron atom is preferred, since it has the smallest atomic weight among the IIIb group atom, so that the molecular weight of the anion is decrease.

When the metal salt containing the above anion is used, the shelf stability of the organic electrolytic solution is improved, and in turn, the shelf stability of the organic electrolytic solution cell comprising such electrolytic solution is improved.

The electrolyte to be used in the present invention will be explained in detail.

The cation forming the metal salt is preferably an alkali metal cation or an alkaline earth metal cation. In particular, lithium cation is preferred.

Specific examples of the metal salt comprising the electron attractive group and the anion which has the steric hindrance barrier structure are $(CF_3SO_2)_2N.ME$, $(CF_3SO_2)_3C.ME$, $(C_6H_4F)_4B.Me$, and $(C_6H_4Cl)_4B.ME$ wherein ME is a metal atom such as Li, Na or K. In addition, a metal salt having at least 2 carbon atom, preferably at least 4 carbon atoms such as $C_nF_{2n+1}SO_3Li$ wherein n is an integer of at least 2 has the steric hindrance barrier structure. Particularly preferred examples of the metal salt are $LiB[C_6H_4(CF_3)]_4$, $LiB[C_6H_3(CF_3)_2]_4$ (Lithium tetrakis[3,5-bis(trifluoromethyl)phenyl]borate, hereinafter referred to as "LiTFPB"), $LiB(C_6H_3A_2)_4$ wherein A is —C(CF$_3$)$_2$OCH$_3$, and the like.

A reason for that, in particular, the organic boron metal salt containing the halogen atom can improve the shelf stability of the electrolytic solution and the electrolytic solution cell may be as follows:

The boron atom in an organic chemical can provide four bonds which is more than those of the oxygen or nitrogen atom. Based on the variety of bonding properties, the boron atom can bond with various substituents having the electron attractive group. Further, the metallic properties of the boron atom are stronger than the carbon atom which can provide four bonds. Then, the boron atom is suitable for ionizing the bonded metal.

In the case of a boron compound in which the electron attractive alkyl or phenyl group is simply bonded to the boron atom, for example, $LiBR_4$ wherein R is an alkyl group or a phenyl group, an electron density on the boron atom increases, so that the electron is easily liberated. That is, the compound is more easily oxidized. When such compound is used in combination with the highly active positive electrode active material such as a metal oxide under a high voltage, a part of the compound reacts with the positive electrode active material, whereby the shelf stability of the cell is deteriorated.

To avoid such drawback, the electron attractive group is further introduced in the substituent which is bonded to the boron atom so as to prevent the concentration of electrons on the boron atom.

Specific examples of the electron attractive groups are halogen atoms and the alkyl groups having the halogen atom. In particular, a fluoroalkyl group is preferred, since it forms a strong bond. By the introduction of such electron attractive group on the boron atom, the discharge of electrons from the boron atom is suppressed and the oxidation of the electrolytic solution is prevented, whereby the shelf stability of the electrolytic solution is improved.

In particular, LiTFPB has good properties, since it contains two trifluoromethyl groups at the ortho and meta positions of the phenyl group which is bonded to the boron atom, and in total, eight electron attractive groups.

In LiTFPB, the maximum distance between the a charge center atom and the other atom in the anion is a distance between the boron atom and the fluorine atom, which is about 6.1 Å.

LiTFPB has the following chemical structure:

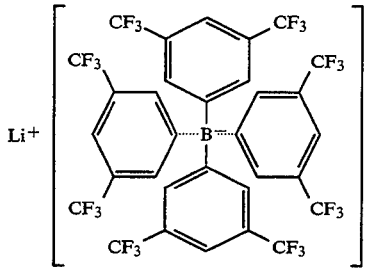

When the metal salt having the steric hindrance barrier structure is dissolved in the solvent of the electrolytic solution, it is only a bulky molecule. But, under a condition where the metal component of the positive current collector is dissolved at the high voltage, the metal component provides a di- or higher valent cation, and the cation acts as a counter ion against the anionic part of the metal salt having the steric hindrance barrier structure. Since the metal salt is bulky and the degree of steric hindrance is large, the reaction between them does not proceed further, and the further dissolution of the metal component of the positive current collector is suppressed.

Examples of the positive current collector material are aluminum, titanium, nickel, copper, and alloys comprising the same.

Since the metal component of the positive current collector which provides the cation having the larger valency is less dissolved in the solvent, aluminum which provides the trivalent ion is more preferred than other metals which provide the divalent ions. Titanium is also preferred, since it provides tri- or tetravalent ion.

Preferably, the organic electrolyte comprising the above metal salt having the steric hindrance barrier structure has an anion which is resistant to oxidization, in addition to the anion being steric hindrance.

In assembling the cell using the above electrolytic solution, an integral member of an alkali metal or a compound comprising the alkali metal and a collector material such as a stainless steel net is used as a negative electrode.

Examples of the alkali metal are lithium, sodium, potassium, and examples of the compound comprising the alkali metal are alloys of the alkali metals with aluminum, lead, indium, cadmium, tin, magnesium, and the like; a compound of the alkali metal and carbon; and compounds of the lower potential alkali metals with metal oxides or sulfides (e.g. $Nb_2O_6$).

Examples of the organic solvent in which the above electrolyte is dissolved are ethers (e.g., 1,2-dimethoxyethane, 1,2-dimethoxymethane, dimethoxypropane, 1,3-dioxolane, tetrahydrofuran, 2-methyltetrahydrofuran, 4-methyl-1,3-dioxolane, etc.), esters (e.g., propylene carbonate, ethylene carbonate, butylene carbonate, γ-butyrolactone, γ-valerolactone, etc.), sulfolane, and the like.

Among them, the esters are preferred, since they will improve the shelf stability of the electrolytic solution, when they are used in combination with the electrolyte comprising the metal salt which contains the anion having the steric hindrance barrier structure, in particular, the metal salt having at least 4 haloalkyl groups or the organic boron metal salt containing the halogen atom.

A concentration of the electrolyte in the electrolytic solution is not critical. Usually, in the organic solvent, the metal salt having at least 4 haloalkyl groups or the organic boron metal salt containing the halogen atom is dissolved in a concentration of from 0.01 to 2 mol/liter, preferably from 0.05 to 1 mol/liter.

When the metal salt to be used is pretreated with a halogen-free solvent, it is easily dissolved in the solvent.

It was tried to dissolve the lithium salts in $CH_2Cl_2$ which is one of the typical halogen-containing solvents in which the metal salt is dissolved with difficulty, but many lithium salts were hardly dissolved in $CH_2Cl_2$ and precipitated therein. A conductivity of the electrolytic solution was only several ten $\mu S/cm$ or less. Many lithium salts were hardly dissolved also in perfluorotrialkylamine which is one of the flurosolvents.

When LiTFPB was dissolved in a halogen-free ether, the solution was dried under reduced pressure, and then $CH_2Cl_2$ was added to the residue, LiTFPB was dissolved in $CH_2Cl_2$ at a concentration of 20 mmol/liter without difficulty, and the conductivity of the solution reached 820 $\mu S/cm$. That is, the conductivity was improved by ten times or larger. Such phenomenon was observed not only in the halogen-containing solvents but also in the esters having a large viscosity.

Consequently, when the metal salts which are hardly dissolved in the halogen-containing solvents or esters are pretreated with the halogen-free solvent, a solution velocity and a solubility of the metal salts in those solvents are improved.

In a preferred embodiment of the present invention, the electrolytic solution is prepared by pretreating the metal salt with the halogen-free solvent, for example, by dissolving, contacting or dipping the metal salt in the halogen-free solvent, and then adding the solvent to dissolve the metal salt in the solvent. Preferably, a weight ratio of the halogen-free solvent to the metal salt after pretreatment is less than 0.1:1, more preferably less than 0.05:1. In particular, the weight ratio of the halogen-free solvent to the metal salt is desirably at least 0.0005:1, especially at least 0.005.

Examples of the solvent of electrolytic solution on which the pretreatment with the halogen-free solvent is effective are halogen-containing solvents (e.g., $CH_2Cl_2$, $CHCl_3$, $CCl_4$, $CBrF_3$, $CF_3CF_2CHCl_2$, $CClF_2CF_2CHClF$, etc.), esters having a large viscosity (e.g., propylene carbonate, ethylene carbonate, butylene carbonate, $\gamma$-butyrolactone, $\gamma$-valerolactone, etc.), sulfolane, and the like.

The highly viscous solvent on which the pretreatment with the halogen-free solvent is effective has a viscosity of at least 1 cp, preferably at least 1.5 cp, more preferably at least 2.0 cp, at 25° C.

Examples of the halogen-free solvent are ethers (e.g., diethyl ether, 1,2-dimethoxyethane, tetrahydrofuran, glyme, polyethylene oxide, etc.), esters (e.g., propylene carbonate, $\gamma$-butyrolactone, methyl formate, etc.), amines, ketones, sulfur-containing solvents, protic solvents (e.g., alcohols, water, etc.), and the like. Among them, the ethers and esters are preferred. In particular, the ethers are preferred since the solubility of the alkali metal salt therein is large, and they have low reactivity with the negative electrode.

The protic solvent such as the alcohol is reactive with lithium and has an adverse affect on the negative electrode, it is not usually used in the organic electrolytic solution cell. But, in the present invention, since the protic solvent is strongly bound by the alkali metal salt, it will have reduced reactivity with the negative electrode.

A positive electrode is produced by compounding a positive electrode active material such as a metal oxide (e.g., manganese dioxide, vanadium pentoxide, chromium oxide, lithium cobalt oxide, etc.) or a metal sulfide (e.g., molybdenum disulfide, etc.) and necessary additives such as a conductive aid or a binder (e.g., polytetrafluoroethylene, etc.), and molding it around a core of a current collector member such as an aluminum foil or a stainless steel net.

When the metal oxide is used as the positive electrode active material, a high voltage is generated. At the high voltage, the conventional cell comprising $LiBF_4$ or $LiB(C_6H_5)_4$ has poor shelf stability. But, the electrolytic solution of the present invention does not decrease the shelf stability of the cell at such high voltage.

By making reference to an aluminum foil as a positive current collector, an effect of suppressing dissolution of aluminum in the electrolytic solution will be explained.

The difference between the electrolyte of the present invention, which has the steric hindrance barrier structure and conventionally used $CF_3SO_3Li$ appears from around 3.1 V.

Above 3.1 V, an oxidation current starts to flow in the case of $CF_3SO_3Li$. That is, the oxidation current flows through the aluminum body, and aluminum itself is oxidized and dissolved in the electrolytic solution. On the other hand, when $C_4F_9SO_3Li$ is used according to the present invention, substantially no oxidation current flows through the aluminum body, and the oxidation current starts to flow at about 4.6 V. In addition, when LiTFPB is used, there is no range in which the current suddenly increases even around 10 V. This means that LiTFPB is the very stable salt.

When the electrolyte of the present invention is used, a combination with the positive current collector made of aluminum or its alloy is desirable in view of safety.

That is, when the potential of the positive electrode decreases to 350 mV or lower based on the Li level, in the case of the abnormal discharging of the cell, the positive current collector is alloyed and crumbled to pieces. Thereby, no current is collected by the positive electrode and the current is shut off, so that abnormal heating of the cell is prevented.

To this end, the cell is properly designed by taking the following factors into account.

A first factor is selection of a part at which the current is shut off. The most suitable part for this purpose is a tab part of the current collector, namely a lead section which is connected to one edge of the plate-form positive electrode and links the positive electrode and the positive electrode terminal in the positive current collector. When this part is alloyed, it is crumbled to pieces and dropped off, whereby the current is shut off.

Second, the part at which the current is shut off is wet with the electrolytic solution. This is because aluminum is alloyed only where the electrolytic solution is present. Therefore, the electrolytic solution is filled to a level of the part at which the current is shut off, or the part at which the current is shut off is covered by a material in which the electrolytic solution is permeable, whereby the part is wet with the electrolytic solution.

Third, a pulling stress is applied on the part at which the current is shut off. If a compression stress is applied on this part, the once broken part is rebonded though a part of aluminum alloy drops off.

A direction of the pulling stress is arbitrary. Under the pulling stress, the once crumbled parts are separated and the current is surely shut off.

In a preferred embodiment, the part at which the current is shut off is thinner than other parts. If the lead section is shut off at a part other than the above desired part, and the compression stress is applied on the other part, the above current-shut off effect is not sufficiently achieved.

While the pulling stress may deteriorate the stability of the current collector at the voltage of 4.2 V or higher, the influence of pulling stress can be suppressed to a small degree by the use of the organic metal salt of the present invention. For example, an aluminum member which is produced by annealing from a high temperature and has small strain is more stable than an aluminum member which is produced by cold rolling and has large strain. When $LiCF_3SO_3$ or the like is used as the electrolyte, the aluminum member having the larger strain is dissolved in the electrolytic solution at the high voltage. When the metal salt of the present invention is used, the aluminum member having the large stain is also stable. Accordingly, the strain caused by the pulling stress in the current collector has less influence on the stability, when the metal salt of the present invention is used.

The aluminum member which has the large strain by the cold rolling has an advantage. That is, a grain size of aluminum is decreased, and alloying of aluminum and lithium uniformly proceeds in the case of abnormal discharge of the cell, so that the current is surely shut off. In addition, the current collector having a thickness of 30 μm or less has sufficient strength, for example, tensile strength of at least 10 kgf/mm$^2$, for instance 10 to 20 kgf/mm$^2$.

As a specific surface area of the positive electrode active material increases, the shelf stability of the cell increases. In the present invention, the positive electrode active material has preferably a surface area of 50 m$^2$/g or less, more preferably 30 m$^2$/g or less, especially 20 m$^2$/g or less.

Preferably, an active surface of the metal oxide of the active electrode active material is treated with a compound of an alkali metal or an alkaline earth metal, since the shelf stability is further improved. When the cell is predischarged after the assembly of the cell, the shelf stability of the cell is improved to some extent.

PREFERRED EMBODIMENTS OF THE INVENTION

The present invention will be illustrated by the following Examples, which do not limit the scope of the present invention in any way. In Examples, "parts" are by weight.

EXAMPLE

In ethyl ether which is a halogen-free solvent, $(CF_3SO_2)_3C.Li$, $C_4F_9SO_3Li$ and LiTFPB were dissolved, and the solution was evaporated under reduced pressure to decrease a weight ratio of ethyl ether to the lithium salts to about 0.04:1. To the residue, propylene carbonate was added to obtain an electrolytic solution having a composition of 0.1 mol/liter of LiTFPB, 0.1 mole/liter of $(CF_3SO_2)_3C.Li$, and 0.1 mol/liter of $C_4F_9SO_3Li$ in propylene carbonate.

Propylene carbonate has a viscosity of about 2.5 cp at 25° C.

Figure 2:
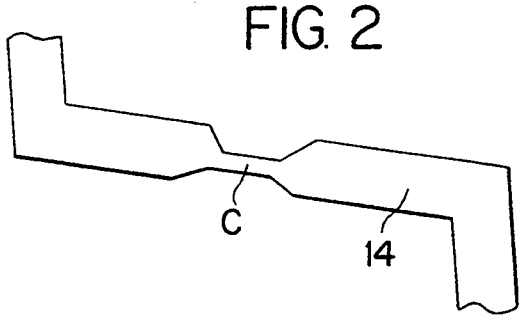
FIG. 2 is an enlarged view of a part of a positive current collector under stress.

A mass of electrolytic manganese dioxide was heat treated and further heat treated with an aqueous solution of lithium hydroxide to obtain an active material having a specific surface area of 18 m$^2$/g. The manganese oxide active material (100 parts), carbon black (5 parts) and a water/solvent mixture in which polytetrafluoroethylene powder was dispersed (5 parts of the solid content) were mixed, and the mixture was coated over both surfaces of a sheet of aluminum foil having a thickness of 20 μm and dried to form a sheet having a thickness of 0.4 mm and a width of 30 mm. After bonding a lead part which had been rolled to a thickness of 30 μm and had a pulling stress of 17 kg/mm$^2$, a shape of which is shown in FIG. 2 to the sheet-from positive electrode, the electrode was dried at 250° C., and cooled down to room temperature in a dry atmosphere.

Then, the sheet-form positive electrode was sandwiched between a pair of microporous polypropylene films each having a thickness of 25 μm. Over the sandwiched positive electrode, there was laminated a negative electrode comprising a sheet form lithium having a thickness of 0.18 mm and a width of 30 mm which was press bonded to a stainless steel net. Then, the laminated positive and negative electrodes were spirally wound to form a spiral electrode body, which was inserted in a cell case having a cylinder form with a bottom and an outer diameter of 15 mm.

After spot welding lead wires for the positive and negative electrodes, the above prepared electrolytic solution was filled in the cell case.

Thereafter, the opening of the cell case was sealed by a conventional method to produce an organic electrolytic solution cell having a structure of FIG. 1.

A pulling stress was applied on a part of the positive current collector which was immersed in the electrolytic solution in a certain direction.

The cell of FIG. 1 comprises a positive electrode 1, a negative electrode 2, a separator 3 and an electrolytic solution 4. For simplicity, current collectors are not shown.

The cell further comprises a cell case 5 made of stainless steel, and the cell case 5 functions also as a negative electrode terminal. At the bottom of the cell case, an insulator 6 made of a polytetrafluoroethylene sheet is provided. On the inner peripheral wall surface of the cell case, an insulator 7 made of a polytetrafluoroethylene sheet is provided. The spiral electrode body consisting of the positive and negative electrode 1, 2 and the separator 3, and the electrolytic solution 4 are contained in the cell case 5.

The opening of the cell case 5 is closed with a sealing plate 8 made of stainless steel. The sealing plate has a gas vent hole 8a at its center. The sealing section has an annular packing 9 made of polypropylene, a flexible thin plate 10 made of titanium, and a thermally deformable annular member 11 made of polypropylene.

Since the thermally deformable member 11 is deformed by the temperature change, it changes a breaking pressure of the flexible plate 10.

The cell further comprises a terminal plate made of rolled steel plate 12 plated by nickel. The plate 12 has a cutting edge 12a and a gas vent hole 12b. When a gas is generated in the cell and the internal pressure increases, the flexible thin plate 10 is deformed by the increased internal pressure and broken by the cutting edge 12a, then the gas in the cell is exhausted through the hole 12b, whereby the breakage of the cell is prevented.

The cell has an insulating packing 13 and a lead member 14 which is a part of the current collector. The lead member 14 electrically connects the positive electrode 1 and the sealing plate 8, and the terminal plate 12 functions as the positive electrode terminal since it contacts to the sealing plate 8. A lead member 15 electrically connects the negative electrode 2 and the cell case 5.

As explained below, the stress is applied on a part of the positive current collector 4 which is dipped in the electrolytic solution 14, in the direction for pulling the collector 14.

When sealing the opening of the cell case 5, the terminal plate 12 is shifted in the direction A. Then, the terminal plate 12 is moved in the lateral direction and placed in the designed position, whereby the stress is applied at the point C of the positive current collector 14. The point C is made thinner than other parts of the positive current collector 14.

Comparative Example 1

LiB(C$_6$H$_5$)$_4$ was dissolved in propylene carbonate to obtain an electrolytic solution having a composition of 0.3 mol/liter of LiB(C$_6$H$_5$)$_4$ in propylene carbonate.

In LiB(C$_6$H$_5$)$_4$, the maximum distance between the anion center atom and the other atom is about 5.6 Å, while this electrolyte contains no halogen atom.

Comparative Example 2

CF$_3$SO$_3$Li was dissolved in propylene carbonate to obtain an electrolytic solution having a composition of 0.3 mol/liter of CF$_3$SO$_3$Li in propylene carbonate.

In CF$_3$SO$_3$Li, the maximum distance between the anion center atom and the other atom is only about 3.9 Å, while this electrolyte contains halogen atoms, namely fluorine atoms.

Using each of the electrolytic solutions of Comparative Examples 1 and 2, an organic electrolytic solution cell was assembled in the same manner as in Example.

With each of the cells assembled in Example and Comparative Examples 1 and 2, a minimum voltage was measured when the cell was discharged at 0.3 A for 10 milliseconds. Each cell was discharged at a constant current of 50 mA, and a capacity was measured after storing it at 80° C. for 10 days, and compared with the original capacity before storing. The results are shown in the Table.

TABLE

| Example No. | Minimum Voltage (V) | Capacity ratio (After storage/before storage) |
|---|---|---|
| Example | 2.73 | 0.96 |
| Comp. 1 | 2.47 | 0.04 |
| Comp. 2 | 2.61 | 0.00 |

As seen from the results of the Table, the cell of Example had the high voltage when it was discharged at 0.3 A for 10 milliseconds, and suffered from less decrease of the capacity after storage. That is, it had good shelf stability. On the contrary, the cells of Comparative Examples 1 and 2 did not discharge after storage. That is, they had poor shelf stability.

When the cell was assembled using the positive current collector lead member having no thinned part, or applying no stress on the lead member or applying a stress on the lead member in a compression direction, and forcedly overdicharged at 10 A. After reaching $-3$ V, the cell was discharged at a constant voltage of $-3$ V. The shut off of the current was insufficient in some cells, and the shut off function did not work surely. In the cells of the present invention, the current was surely shut off in the course of overdischarge, and the cell functioned safely.

What is claimed is:

1. An organic electrolytic solution comprising an organic solvent, and a metal salt comprising at least one electron attractive group and an anion which comprises at least one element selected from the elements of the IIIb to VIb group of the Periodic Table and a charge-center atom of which is bonded to said electron attractive group by an intermediate backbone, wherein a maximum distance between the center of said charge-center atom and the center of other atom in said anion is at least 4 Å.

2. The organic electrolytic solution according to claim 1, wherein said maximum distance between the center of said charge-center atom and the center of other atom in said anion is at least 5 Å.

3. The organic electrolytic solution according to claim 1, wherein said metal salt comprising the electron attractive group and the anion which has the steric hindrance barrier structure is at least one metal salt selected from the group consisting of (CF$_3$SO$_2$)$_2$N.ME, (CF$_3$SO$_2$)$_3$C.ME, (C$_6$H$_4$F)$_4$B.ME, (C$_6$H$_4$Cl)$_4$B.ME wherein ME is a metal atom; C$_n$F$_{2n+1}$SO$_3$Li wherein n is an integer of at least 2; LiB[C$_6$H$_4$(CF$_3$)[$_4$, LiB]C$_6$H$_3$(CF$_3$)$_2$]$_4$, and LiB(C$_6$H$_3$A$_2$)$_4$ wherein A is a group of the formual:—C(CF$_3$)$_2$OCH$_3$.

4. The organic electrolytic solution according to claim 1, wherein said electrolyte is a metal salt selected from the group consisting of metal salts having at least 4 haloalkyl groups and organic boron metal salts containing a halogen atom.

5. The organic electrolytic solution according to claim 1, wherein said electrolyte is a metal salt having at least 5 haloalkyl groups.

6. The organic electrolytic solution according to claim 5, wherein said electrolyte is a metal salt having at least 4 benzene rings and at least 2 haloalkyl group on at least one benzene ring.

7. The organic electrolytic solution according to claim 1, wherein said electrolyte is an organic boron lithium salt containing a halogen atom, and said organic solvent is at least one solvent selected from the group consisting of esters and carbonates.

8. An organic electrolytic solution cell comprising a positive electrode, a negative electrode and an organic electrolytic solution comprising an organic solvent, and a metal salt comprising at least one electron attractive group and an anion which comprises at least one element selected from the elements of the IIIb to VIb group of the Periodic Table and a charge-center atom of which is bonded to said electron attractive group by an intermediate backbone, wherein a maximum distance between the center of said charge-center atom and the center of other atom in said anion is at least 4 Å.

9. The cell according to claim 8, wherein said positive electrode has a positive current collector made of aluminum or titanium.

10. The cell according to claim 9, wherein said positive current collector is bonded to one edge of the plate form positive electrode and contacted to the electrolytic solution, and a pulling stress is applied on said positive current collector.

* * * * *